(12) United States Patent
Harada et al.

(10) Patent No.: US 7,777,378 B2
(45) Date of Patent: Aug. 17, 2010

(54) ELECTRIC ROTATING MACHINE

(75) Inventors: Taku Harada, Toyota (JP); Shinichi Kojima, Toyota (JP); Makoto Tomita, Toyota (JP); Shingo Uchiyama, Toyota (JP); Hirokazu Nishimura, Toyota (JP); Eiji Ichioka, Toyota (JP); Hideto Watanabe, Toyota (JP); Kouichi Sugizaki, Toyota (JP); Fumimori Imaeda, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 278 days.

(21) Appl. No.: 11/994,054

(22) PCT Filed: Nov. 29, 2006

(86) PCT No.: PCT/JP2006/324305
§ 371 (c)(1),
(2), (4) Date: Dec. 27, 2007

(87) PCT Pub. No.: WO2007/064018
PCT Pub. Date: Jun. 7, 2007

(65) Prior Publication Data
US 2009/0206689 A1 Aug. 20, 2009

(30) Foreign Application Priority Data
Nov. 30, 2005 (JP) .............................. 2005-345916
Apr. 18, 2006 (JP) .............................. 2006-114508
Jul. 27, 2006 (JP) .............................. 2006-205284

(51) Int. Cl.
H02K 5/10 (2006.01)
(52) U.S. Cl. ....................................................... 310/85

(58) Field of Classification Search .................... 310/85, 310/88, 91, 216.012, 216.013, 216.055, 216.075, 310/216.096, 216.097, 216.136; 417/312, 417/372, 410.5, 523, 552, 553, 368, 410.3, 417/423.13; 184/6.16, 65
See application file for complete search history.

(56) References Cited

U.S. PATENT DOCUMENTS

| | | | | |
|---|---|---|---|---|
| 4,449,895 A | * | 5/1984 | Kurahayashi | 417/368 |
| 4,828,466 A | * | 5/1989 | Kim | 418/88 |
| 4,895,496 A | * | 1/1990 | Elson | 417/372 |
| 5,053,666 A | * | 10/1991 | Kliman et al. | 310/216.075 |
| 5,148,090 A | * | 9/1992 | Oku et al. | 318/107 |
| 5,358,392 A | * | 10/1994 | Ukai | 418/55.6 |
| 5,980,222 A | * | 11/1999 | Fry | 417/553 |

(Continued)

FOREIGN PATENT DOCUMENTS

CN 1038860 A 1/1990

(Continued)

*Primary Examiner*—Tran N Nguyen
(74) *Attorney, Agent, or Firm*—Sughrue Mion, PLLC

(57) ABSTRACT

A shield member (90) is arranged on the rotor end face (18*a*) of an electric rotating machine (10). As the rotational velocity of a rotor (18) increases, the shield member (90) moves outward in the radial direction of a rotating shaft (12) to cover a part of the opening (86) of a slot (82). The shield member (90) controls inflow of lubricant from a portion in the axial-direction of the rotating shaft (12) on the outside of the rotor end face (18*a*) to the slot (82). Rotational resistance of the rotor (18) caused by stirring of lubricant can be reduced during high velocity rotation of the rotor (18).

12 Claims, 13 Drawing Sheets

U.S. PATENT DOCUMENTS

| | | | |
|---|---|---|---|
| 7,414,338 B2 * | 8/2008 | Endo et al. | 310/52 |
| 2004/0071570 A1 * | 4/2004 | Dreiman et al. | 417/410.3 |

FOREIGN PATENT DOCUMENTS

| | | | |
|---|---|---|---|
| JP | 11-69674 A | | 3/1999 |
| JP | 2001-37178 A | | 2/2001 |
| JP | 2001-113968 A | | 4/2001 |
| JP | 2005120835 A | * | 5/2005 |
| JP | 2005-168194 A | | 6/2005 |

* cited by examiner

B-B

ELECTRIC ROTATING MACHINE

TECHNICAL FIELD

The present invention relates to an electric rotating machine including a rotor in which salient poles projecting along the radial direction that is perpendicular to the rotational axis are arranged along the circumferential direction.

BACKGROUND ART

In an electric rotating machine such as an electric motor, a rotor may be provided with salient poles projecting along the radial direction that is perpendicular to the rotational axis, which are arranged along the circumferential direction at predetermined intervals. A reluctance motor is one example of a conventionally known electric rotating machine having such a rotor including salient poles. With the salient poles being arranged along the circumferential direction, portions having low and high reluctance, i.e., magnetic resistance, are provided alternately along the rotor circumferential direction. By creating a rotating magnetic field around such a rotor by means of a stator, the salient poles are attracted to the rotating magnetic field, such that torque for rotating the rotor can be generated.

In a reluctance motor, the rotor is not provided with a permanent magnet. A reluctance motor is a motor that generates torque from differences in reluctance as described above. This motor is low-cost because the cost of a permanent magnet, which is not required, can be eliminated. Because a permanent magnet is not required, it is also unnecessary to provide a structure for fixing a permanent magnet on the rotor, thereby enabling further simplifying of the structure. It is obviously also unnecessary to consider the possibility of the permanent magnet being detached from the rotor due to centrifugal force caused by rotation, and the motor is suitable for use at high rotational velocity. Because of these advantages, reluctance motors are regarded as prospective power sources for use in automobiles, for example.

However, in an electric rotating machine in which salient poles are arranged on the rotor, a disadvantage is caused in that, when the rotor is rotated, the salient poles agitate air around the rotor. Particularly during high-velocity rotation, as compared to in an electric rotating machine in which the rotor has a substantially cylindrical shape, rotational resistance due to air agitation is undesirably increased.

For the purpose of reducing this rotational resistance, a technique of covering the portions between adjacent salient poles at a rotor end face is conventionally known. For example, according to the electric motor described in Japanese Patent Laid-Open Publication No. Hei 11-69674, a disc-shaped plate member is provided at an end portion along the axis direction of a rotational shaft of the rotor core, so as to prevent air from moving in and out between the grooves between the salient poles of the rotor and the outside space beyond the rotor end face in the rotational axis direction, thereby reducing rotational resistance due to air agitation caused during rotor rotation.

In electric rotating machines as described above, in order to lubricate the bearing supporting the rotational shaft of the rotor and to cool the rotor and the stator, lubricating oil may be supplied to these parts from outside. Such electric rotating machines generally operate in a state in which the lubricating oil is present at the bottom portion within the housing.

When an electric rotating machine employing this type of lubricating system is configured with a rotor having the above-noted salient poles, the lubricating oil may flow into the groove-shaped gaps (hereinafter referred to as "slots") between the adjacent salient poles, such that the salient poles would hit on the lubricating oil, causing rotational resistance of the rotor. This rotational resistance of the rotor due to agitation of lubricating oil (hereinafter referred to as "oil agitation resistance") is extremely large compared to when agitation occurs with respect to air alone. Particularly when the rotor is rotated at a high velocity, the oil agitation resistance becomes serious, resulting in a large decrease in the torque output from the electric rotating machine. When the electric rotating machine is mounted on a vehicle as a power source, the oil agitation resistance would be a factor causing degradation in fuel consumption. Accordingly, in electric rotating machines, a technique for reducing oil agitation resistance during high-velocity rotation is particularly desired.

The present invention provides an electric rotating machine in which flow of a lubricant oil into the slots between adjacent salient poles is restrained so as to enable reduction of oil agitation resistance during high-velocity rotation.

DISCLOSURE OF THE INVENTION

An electric rotating machine according to the present invention includes a rotor in which salient poles projecting along a radial direction that is perpendicular to a rotational axis are arranged along a circumferential direction at predetermined intervals, and operates in a state in which oil is present at a bottom portion within a housing that houses the rotor. This electric rotating machine includes a shielding means provided at an end face of the rotor for shielding oil from flowing from a portion outside the end face in the axial direction of a rotational shaft of the rotor into a slot between adjacent salient poles of the rotor. By restraining oil from flowing into the slot, oil agitation resistance during high-velocity rotation of the rotor can be reduced.

Preferably, the shielding means projects outward along the radial direction in response to an increase in the rotor rotational velocity, so as to cover an opening of the slot by a larger area.

Preferably, the shielding means is movable in the radial direction along the rotor end face, and includes a shield member for covering the opening of the slot, and a support means for supporting the shield member to be movable outward along the radial direction in response to an increase in the rotor rotational velocity.

Preferably, one end of the support means is connected to the shield member and the other end is connected to the rotor, and the support means acts as a biasing member that biases the shield member to a position located at a predetermined distance from the rotational shaft. Further, the shield member may preferably be a movable member that moves outward along the radial direction against the biasing force of the biasing member by a centrifugal force applied in response to an increase in the rotor rotational velocity.

Further, the biasing member preferably is a spring that extends along the radial direction in response to an increase in the rotor rotational velocity.

An electric rotating machine according to another embodiment of the present invention includes a fan that creates, in the oil present within the housing, a flow outward along an axial direction so as to shield the oil from flowing from a portion outside the end face in the axial direction into the slot between the adjacent salient poles of the rotor. Even when the rotor rotational velocity is increased, because the axially outward flow created by the fan shields the oil from flowing into the slot, it is possible to reduce oil agitation resistance during high-velocity rotation of the rotor.

Preferably, the fan is configured by coupling a plurality of vanes on the rotational shaft of the rotor.

An electric rotating machine according to the present invention includes a rotor in which a plurality of salient poles projecting along a radial direction that is perpendicular to a rotational axis are arranged along a circumferential direction at predetermined intervals, and operates in a state in which oil is present at a bottom portion within a housing that houses the rotor. This electric rotating machine includes a shielding means provided on the rotor for shielding oil from flowing from outside a rotational shaft of the rotor into a slot between adjacent salient poles of the rotor. By restraining oil from flowing into the slot, oil agitation resistance during high-velocity rotation of the rotor can be reduced.

Preferably, the shielding means is a member composed of a non-magnetic material for filling between the salient poles. By filling between the salient poles using a non-magnetic material, flow of oil into the slot can be avoided to eliminate oil agitation resistance at the slot while maintaining the performance of the rotor for the electric rotating machine.

Preferably, there is provided a connecting member for connecting the inter-pole filling member and at least one salient pole with one another. With this arrangement, it is possible to prevent the inter-pole filling member from separating from the rotor.

An electric rotating machine according to the present invention may be configured as a rotor in which a plurality of salient poles projecting along a radial direction that is perpendicular to a rotational axis are arranged along a circumferential direction at predetermined intervals, and may operate in a state in which oil is present at a bottom portion within a housing that houses the rotor. Such an electric rotating machine preferably includes a shielding means provided on the rotor or a stator for shielding oil from flowing from outside a rotational shaft of the rotor into a slot between adjacent salient poles of the rotor. The shielding means is a shield plate with outlet, having an oil outlet connecting between the slot and outside. The shielding means provided on the rotor restrains oil from flowing into the slot, and allows oil that entered into the slot to be removed via the oil outlet, thereby enabling to reduce oil agitation resistance during high-velocity rotation of the rotor.

Preferably, the shielding means is a shield plate composed of, or comprising, a non-magnetic material. By forming the shield plate with a non-magnetic material, it is possible to reduce oil agitation resistance while maintaining the performance of the rotor for the electric rotating machine.

Through use of an electric rotating machine as provided by the present invention, oil agitation resistance during high-velocity rotation of the rotor can be reduced.

BEST MODE FOR CARRYING OUT THE INVENTION

Figure 1:
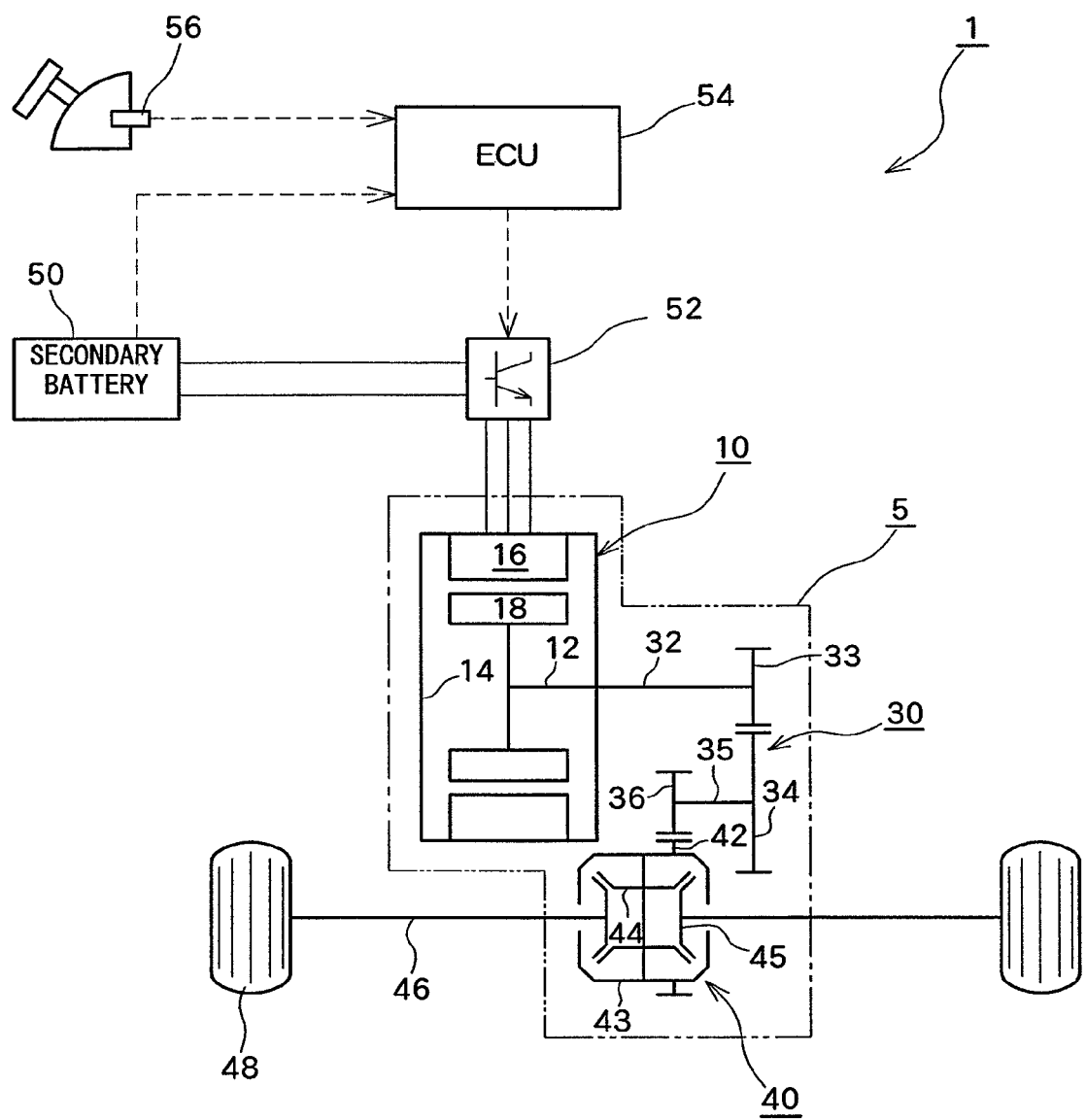
FIG. 1 is a diagram showing a schematic configuration of a vehicle to which an electric rotating machine according to a first embodiment is applied.

Embodiments related to the present invention are explained in detail below while referring to the drawings. As one example, an electric rotating machine integrally coupled to a drive device of a vehicle is described.

First Embodiment

First, a drive device 5 and its control system of a vehicle 1 to which an electric rotating machine 10 according to the present embodiment is applied will be described referring to FIG. 1. FIG. 1 shows a schematic configuration of the drive device 5 and the control system of the vehicle 1. The vehicle 1 includes, as a drive power source, the electric rotating machine 10 which is operating as an electric motor when the vehicle is driven and also is capable of generating electricity when the vehicle is decelerated. Further, the vehicle 1 includes, as a device for transmitting power output from the electric rotating machine 10 to driven wheels 48, a reduction gear device 30 that reduces velocity of rotation conveyed from the electric rotating machine 10 to increase torque. The vehicle 1 further includes a differential gear device 40 for distributing power conveyed from the reduction gear device 30 to the left and right driven wheels 48. The vehicle 1 is further provided with a secondary battery 50 for storing electric power supplied to the electric rotating machine 10, an inverter 52 located between the secondary battery 50 and the electric rotating machine 10 for performing electric power exchange, and an electronic control unit 54 (hereinafter referred to as "ECU") for controlling drive of the electric rotating machine 10 by controlling the inverter 52.

The electric rotating machine 10 is provided with both the function of an electric motor for converting electric power supplied from the inverter 52 into motive power and outputting the motive power via a rotational shaft 12, and the function of an electric generator for converting motive power input via the rotational shaft 12 into electric power and outputting the electric power to the inverter 52. The motor function and the generator function are switchably controlled sequentially by the ECU 54. The electric rotating machine 10 can serve as an electric motor to convey motive power to the driven wheels 48.

The electric rotating machine 10 includes a stator 16 and a rotor 18. The stator 16 is electrically connected to the inverter 52, and is capable of creating a rotating magnetic field upon receiving electric power supply from the inverter 52. The rotor 18 is rotationally driven by being attracted to the rotating magnetic field created by the stator 16. The rotational shaft 12 is coupled to the rotor 18, and rotational drive force generated in the rotor 18 is conveyed from this rotational shaft 12 to the reduction gear device 30. Details of the structure of the rotor 18 are explained later.

The reduction gear device 30 includes a main shaft 32 connected to the rotational shaft 12 of the electric rotating machine 10, a counter drive gear 33 coupled to the main shaft 32, a counter driven gear 34 mating with the counter drive gear 33, a counter shaft 35 coupled to the counter driven gear 34, and a final drive gear 36 coupled to the counter shaft 35 and mating with a ring gear 42 of the differential gear device 40.

Rotation conveyed from the rotational shaft 12 of the electric rotating machine 10 to the main shaft 32 is transmitted to the counter shaft 35 while the rotational velocity is reduced and the torque is increased by means of the counter drive gear 33 and the counter driven gear 34. Rotation conveyed to the counter shaft 35 is transmitted to the differential gear device 40 while further rotational velocity reduction and torque increase are achieved by means of the final drive gear 36 and the ring gear 42 of the differential gear device 40. In this manner, the reduction gear device 30 serves to transmit rotation of the rotational shaft 12 of the electric rotating machine 10 to the differential gear device 40 while reducing velocity of the rotation and increasing torque.

The differential gear device 40 includes the ring gear 42 mating with the final drive gear 36, and a differential gear case 43 fixed to the ring gear 42. The differential gear case 43 rotatably holds left and right side gears 45 respectively connected to left and right drive shafts 46, and holds also a pinion gear 44 orthogonally mating with these side gears 45.

Rotation conveyed from the final drive gear 36 of the reduction gear device 30 to the differential gear case 43 via the ring gear 42 is transmitted from the pinion gear 44 that revolves together with the differential gear case 43 to the side gears 45. Rotation of the side gears 45 is transmitted via the left and right drive shafts 46 to the driven wheels 48. When a difference in rotational velocity is generated between the left and right driven wheels 48 in a situation such as when the vehicle 1 is traveling at a curve, a difference in rotational velocity also occurs between the side gears 45. This difference in rotational velocity can be absorbed by rotation of the pinion gear 44. In other words, the differential gear device 40 is capable of distributing motive power input from the reduction gear device 30 to the left and right drive shafts 46 or the driven wheels 48.

By configuring the vehicle 1 as described above, the electric rotating machine 10 can transmit motive power generated from electric power supplied by the secondary battery 50, via the reduction gear device 30 and the differential gear device 40 to the driven wheels 48 so as to cause the vehicle 1 to travel. In the present configuration example, the drive device 5 does not include a velocity transformer mechanism, such that the velocity of the vehicle 1 is proportional to the rotational velocity of the rotor 18 of the electric rotating machine 10.

Further, during vehicle deceleration, motive power input from the driven wheels 48 into the differential gear device 40 and the reduction gear device 30 can be transmitted to the electric rotating machine 10, converted into electric power therein, and collected in the secondary battery 50. The motive power generation and the electric power collection by the electric rotating machine 10 are appropriately controlled by the ECU 54 depending on factors such as the requested drive force calculated based on an amount of operation detected in the accelerator position sensor 56 and a battery remaining amount detected in the secondary battery 50.

Figure 2:
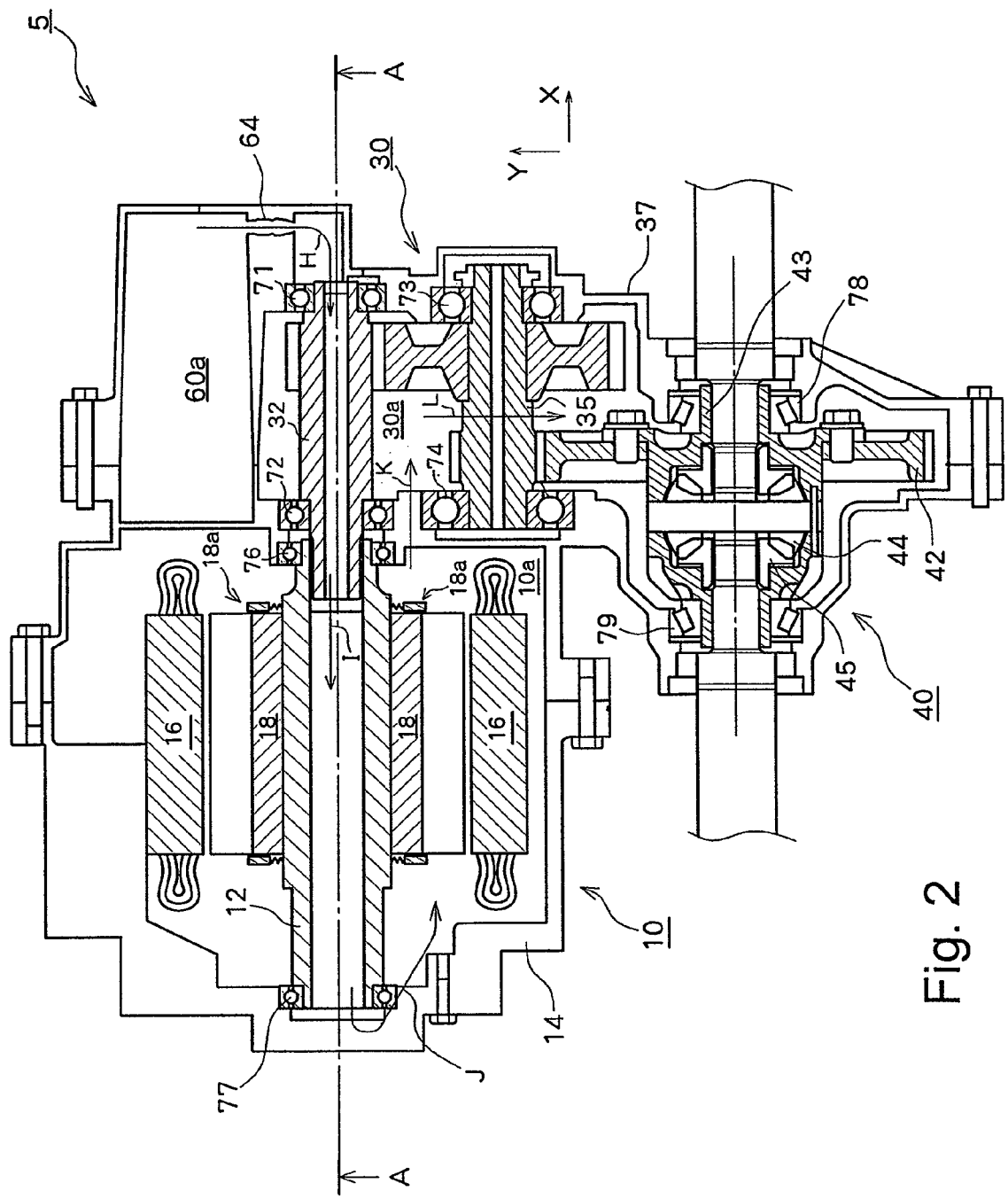
FIG. 2 is a horizontal cross-sectional view of a drive device to which the electric rotating machine of the first embodiment is integrally coupled.
Figure 3:
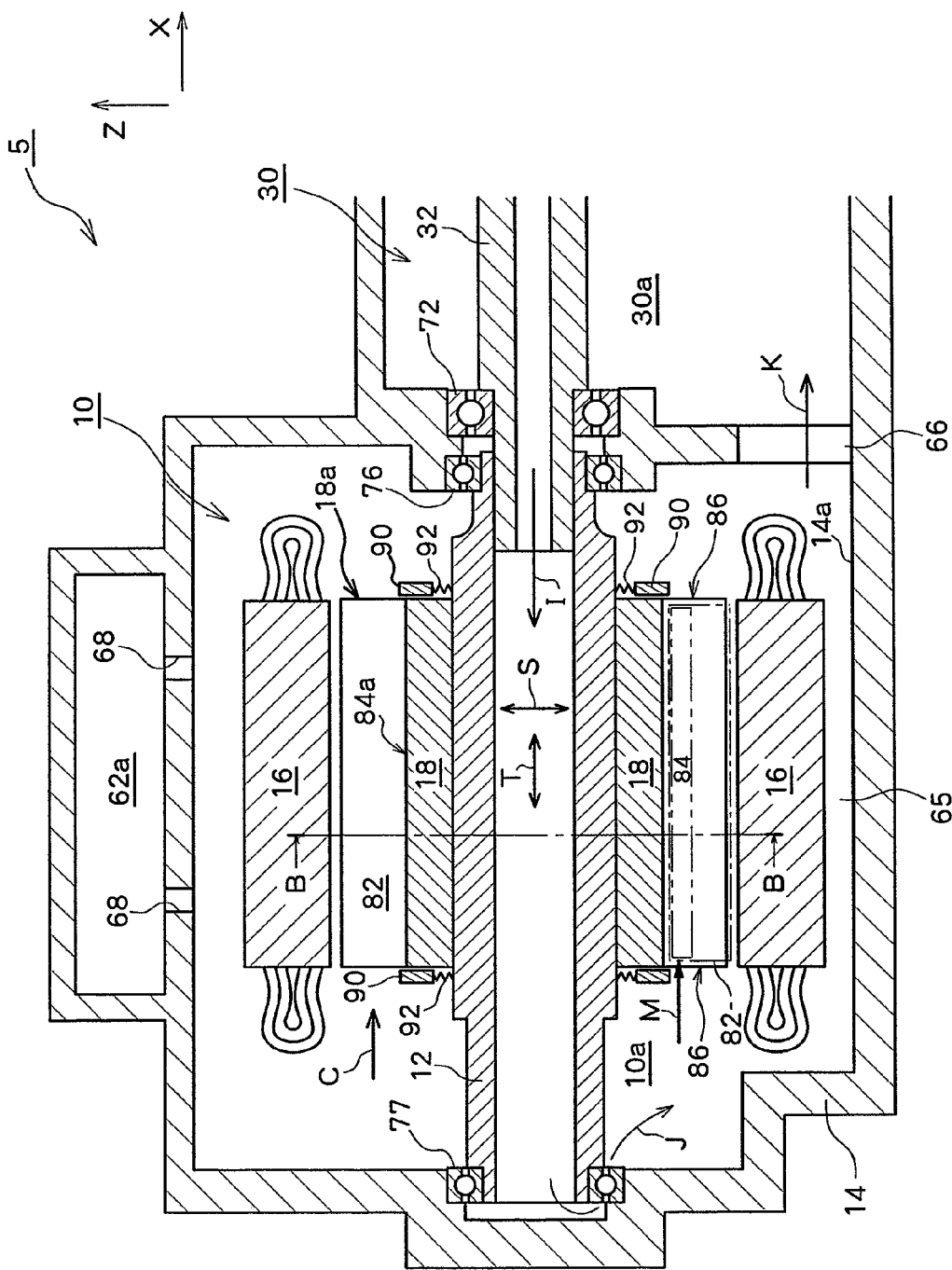
FIG. 3 is a vertical cross-sectional view of the electric rotating machine of the first embodiment, and is a cross-sectional view taken along line A-A in FIG. 2.

The above-described electric rotating machine 10, reduction gear device 30, and differential gear device 40 are integrally coupled to constitute the drive device 5. Further, within this drive device 5, a lubricating oil for lubrication and cooling is commonly used by the electric rotating machine 10, the reduction gear device 30, and the differential gear device 40, and a structure which ensures that the lubricating oil sequentially circulates among these devices is provided. The structure within the drive device 5 and the flow of the lubricating oil circulating within the drive device 5 are described below referring to FIGS. 2 and 3. FIG. 2 is a horizontal cross-sectional view of the drive device 5, with arrow Y denoting the vehicle front direction and arrow X denoting the vehicle left direction. FIG. 3 is a cross-sectional view taken along line A-A in FIG. 2, with arrow Z denoting the vehicle upper direction.

The structure within the drive device 5 will first be explained. The drive device 5 has formed therein a motor chamber 10a that houses the rotor 18, stator 16, and rotational shaft 12 of the electric rotating machine 10 as shown in FIG. 2, a gear chamber 30a that houses the gears 33, 34, 36 and shafts 32, 35 of the reduction gear device 30 and the ring gear 42 and differential gear case 43 of the differential gear device 40 explained in FIG. 1, and a tank chamber 60a that accumulates the lubricating oil within the drive device 5. Further, as shown in FIG. 3, an upper tank chamber 62a that is in communication with the tank chamber 60a shown in FIG. 2 and is provided for temporarily accumulating the lubricating oil during operation of the drive device 5 is formed in the vehicle upper direction (the side denoted by arrow Z) of the stator 16 of the electric rotating machine 10.

The above-noted motor chamber 10a, gear chamber 30a, tank chamber 60a, and upper tank chamber 62a are partitioned by a housing 14 of the drive device 5. A communicating hole 64 is formed between the tank chamber 60a and the gear chamber 30a as shown in FIG. 2, while a communicating hole 66 is formed between the gear chamber 30a and the motor chamber 10a. Further communicating holes 68 are formed between the motor chamber 10a and the upper tank chamber 62a. As such, the motor chamber 10a, gear chamber 30a, tank chamber 60a, and upper tank chamber 62a are in communication with one another, enabling the lubricating oil to flow between those chambers. Further, the main shaft 32 and counter shaft 35 of the reduction gear device 30 and the rotational shaft 12 of the electric rotating machine 10 explained in FIG. 1 are configured hollow inside, with both ends of the hollow portions being open. In other words, the lubricating oil can flow from one end to the other end through these shafts and the rotational shaft 12.

The flow of the lubricating oil circulating within the drive device 5 will next be described. When the vehicle 1 is in a stopped state, i.e., when the drive device 5 is in a non-operating state, a predetermined amount of the lubricating oil is accumulated in the motor chamber 10a and the gear chamber 30a. At this point, the rotor 18 of the electric rotating machine 10 is in a state of being immersed in the lubricating oil.

When the drive device 5 is operated and the vehicle 1 begins to move, the ring gear 42 rotates and scoops up the lubricating oil within the gear chamber 30a to the upper tank 62a. The lubricating oil scooped up to the upper tank 62a drips down through the communicating holes 68 to cool the stator 16, and also flows into the tank chamber 60a via a lubricating oil path not shown. The lubricating oil that flowed into the tank chamber 60a flows through the communicating hole 64 into the gear chamber 30a.

The lubricating oil that flows into the gear chamber 30a lubricates bearings 71-74 that support the main shaft 32 and the counter shaft 35 located within the gear chamber 30a, and also flows into the hollow portion of the main shaft 32 from an end (right side in FIG. 2) of the main shaft 32 as shown by arrow H in FIG. 2. From this hollow portion, the lubricating oil further flows into the hollow portion of the rotational shaft 12 as shown by arrow I, and this lubricating oil subsequently lubricates bearings 76, 77 that support the rotational shaft 12 and flows into the motor chamber 10a as shown by arrow J.

Further, as shown in FIG. 3, the lubricating oil that flows into the motor chamber 10a flows through a lubricating oil path 65 formed between the stator 16 and the housing 14 as well as between the stator 16 and the rotor 18, further flows through the communicating hole 66 located between the motor chamber 10a and the gear chamber 30a as shown by arrow K, and returns to the gear chamber 30a.

The lubricating oil that flows from the motor chamber 10a to the gear chamber 30a and the lubricating oil that flows from the tank chamber 60a to the gear chamber 30a while lubricating the bearings 71-74 merge and flow toward the differential gear device 40 as shown by arrow L in FIG. 2. The lubricating oil that flows into the differential gear device 40 lubricates bearings 78, 79 that support the differential gear case 43, as well as the side gears 45 and the pinion gear 44 located within the differential gear case 43. This oil is scooped up again to the upper tank chamber 62a by the ring gear 42.

By circulating the lubricating oil within the drive device 5 by the rotation of the ring gear 42 as described above, the stator 16 can be cooled with the lubricating oil dripping from the upper tank chamber 62a, while the respective bearings located within the motor chamber 10a and the gear chamber 30a can be lubricated.

Figure 4:
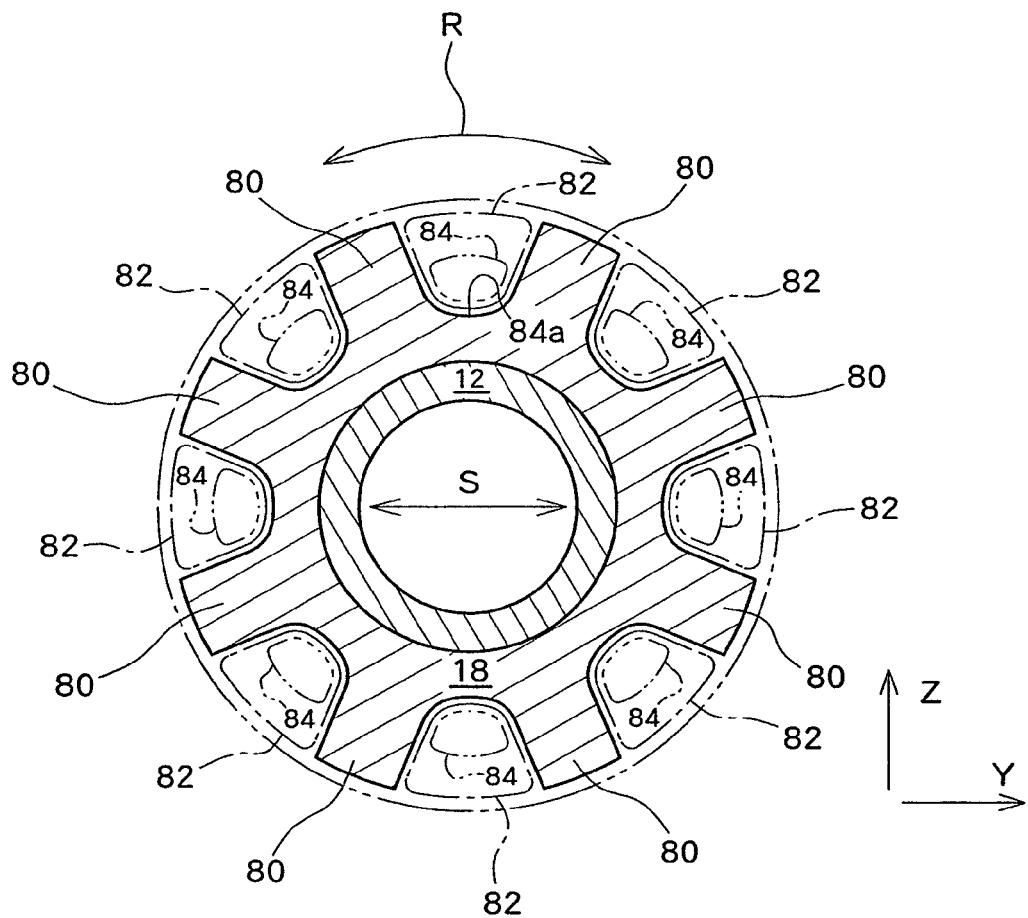
FIG. 4 is a cross-sectional view of the rotor taken along line B-B in FIG. 3.

Next, the detailed structure of the rotor 18 of the electric rotating machine 10 will be described while referring to FIGS. 3 and 4. FIG. 4 shows a cross-section taken along line B-B in FIG. 3. The electric rotating machine 10 according to the present embodiment is a reluctance motor in which salient poles 80 projecting radially outward of the rotational shaft 12 are arranged along the circumferential direction (denoted by arrow R) at predetermined intervals. The salient poles 80 are formed over a predetermined length along the axial direction (denoted by arrow T) of the rotational shaft 12. Groove-shaped gaps 82 are formed between adjacent salient poles 80. These "groove-shaped gaps" are hereinafter referred to as slots 82.

When the rotor 18 is rotated, air within the slots 82 is moved by centrifugal force along the radial direction of the rotational shaft 12 and pushed against the stator 16. As a result, pressure at bottom portions 84 of the slots 82 decreases. The air pushed against the stator 16 flows radially outward of the rotational shaft 12, and is discharged into the motor chamber 10a outside the slots 82. Meanwhile, to the bottom portions 84 of the slots 82 where pressure is decreased, air within the motor chamber 10a tends to enter from radially outside of the rotational shaft 12 via openings 86 of the slots 82. As such, when the rotor 18 is rotated, the salient poles 80 agitate the air within the motor chamber 10a. Accordingly, air flow is created within the motor chamber 10a.

When the electric rotating machine 10 is of a type that operates in "a state in which lubricating oil is present", such as a state in which lubricating oil is accumulated or flowing at the bottom 14a of the housing 14 that houses the rotor 18, i.e., within the motor chamber 10a, when the electric rotating machine 10 is operated and the rotor 18 is rotated, the above-described air flow causes the oil surface to be much undulated. If the salient poles 80 of the rotor 18 strike the undulated lubricating oil, an extremely large rotational resistance (oil agitation resistance) will affect the rotor 18. Particularly when the rotor 18 is rotated at a high velocity, the oil agitation resistance becomes serious, resulting in a large decrease in the torque output from the electric rotating machine 10.

In order to reduce the rotational resistance at the rotor 80 resulting from the salient poles 80 striking the lubricating oil, the present embodiment is configured such that the lubricating oil is restrained from flowing into the slots 82 during high-velocity rotation. The structure of the rotor 18 according to the present embodiment is described referring to FIG. 3.

As shown in FIG. 3, the rotor 18 includes, at its end face 18a, a shield member 90 for shielding the lubricating oil from entering into the slots 82, and a spring 92 that supports the shield member 90. The shield member 90 is a plate member having a shape of a sector when viewed from the direction of the rotational shaft 12, and is arranged so as to be movable along the end face of the rotor 18. The shield member 90 is capable of covering an opening 86 of a slot 82 by a larger area by projecting in the radial direction (denoted by arrow S) of the rotational shaft 12. The spring 92 has one end connected to an end portion of the shield member 90 on the rotational shaft 12 side, and the other end connected to the outer circumferential surface of the rotational shaft 12 of the rotor 18, and is arranged in such a manner as to extendable and retractable in the radial direction S of the rotational shaft 12. The spring 92 biases the shield member 90 such that the shield member 90 is positioned at a predetermined distance along the radial direction from the rotational shaft 12. The shield member 90 and the spring 92 are provided in a plural number corresponding to the respective slots 82, and arranged at predetermined intervals along the circumferential direction R of the rotor 18.

Figure 5A:
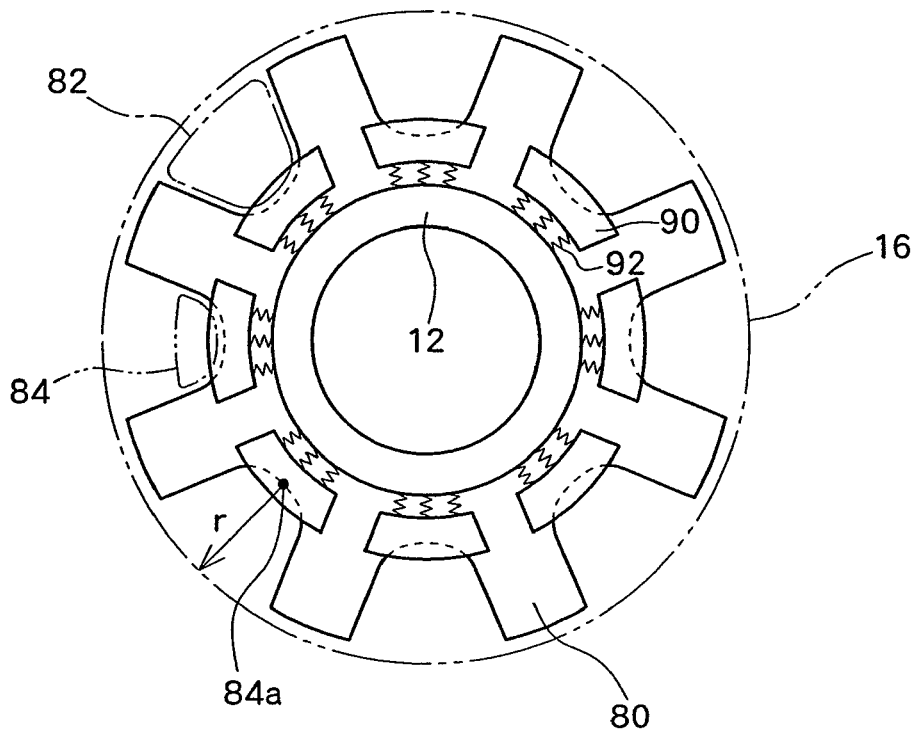
FIG. 5A is a diagram of a rotor end face as viewed from the direction denoted by arrow C in FIG. 3, and shows the rotor in a stopped state or a state of low-velocity rotation.
Figure 5B:
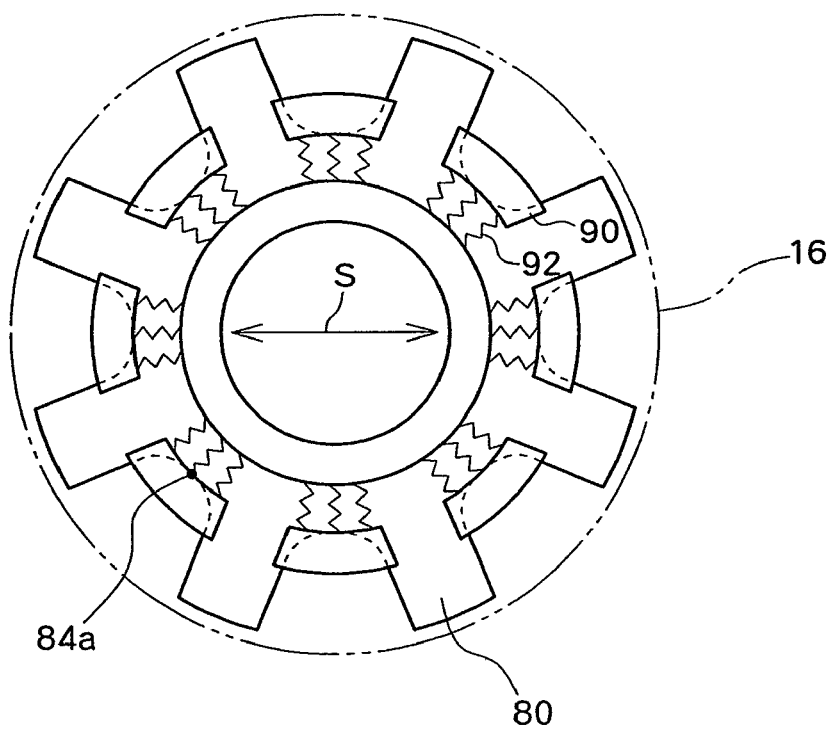
FIG. 5B is a diagram of a rotor end face as viewed from the direction denoted by arrow C in FIG. 3, and shows the rotor in a state of high-velocity rotation.

Operation of the shield member 90 and the spring 92 is next described together with the flow of the lubricating oil within the motor chamber 10a while referring to FIGS. 3, 5(a), and 5(b). FIGS. 5(a) and 5(b) are diagrams showing an end face of the rotor 18 viewed from the direction denoted by arrow C in FIG. 3. FIG. 5(a) shows a state in which the rotor 18 is stopped or rotated at a low velocity, while FIG. 5(b) shows a state in which the rotor 18 is rotated at a high velocity.

When the rotor 18 is not rotated or rotated at a low velocity, the spring 92 is in a contracted state as shown in FIG. 5(a), and the shield member 90 hardly covers the opening 86 of the slot 82 described in FIG. 3. In other words, a flow path between the rotor 18 and the stator 16 is maintained. Accordingly, when the rotor 18 starts to rotate from the stopped state, the lubricating oil within the slot 82 is agitated by the salient poles 80, and is readily discharged outside from the openings 86 of the slot 82 along the axial direction (denoted by arrow T) of the rotational shaft 12.

Further, when the rotor 18 is rotated at a low velocity, and, as shown by arrow J in FIG. 3, the lubricating oil that flowed into the motor chamber 10a flows toward the gear chamber 30a not only through the oil path 65 but also via the slots 82, sufficient flow path area can be ensured at the rotor end face 18a, without causing a situation in which the shield member 90 obstructs the flow of lubricating oil within the slots 82.

When the rotor 18 is rotated at a high velocity, as shown in FIG. 5(b), the shield member 90 is moved radially outward (denoted by arrow S) of the rotational shaft 12 along the rotor end face 18a described in FIG. 3. At this point, centrifugal force in accordance with the rotational velocity is acted on the shield member 90, and the spring 92 is extended by this centrifugal force. In other words, the shield member 90 is displaced against the biasing force of the spring 92. The displaced shield member 90 covers the opening 86 of the slot 82 by a larger area along the radial direction S of the rotational shaft 12 from the inner side. In this manner, as shown in FIG. 3, it is possible to restrain the lubricating oil within the motor chamber 10a from flowing from axially outside of the rotor end face 18a into the bottom portion of the slot that has the particularly low pressure within each slot 82. Accordingly, it is possible to reduce oil agitation resistance during when the rotor 18 is rotated at a high velocity.

As described above, by causing the shield member 90 to project radially outward of the rotational shaft 12 along the rotor end face 18a in response to an increase in the rotational velocity of the rotor 18, the opening 86 of the slot 82 can be covered by a larger area.

Figure 6:
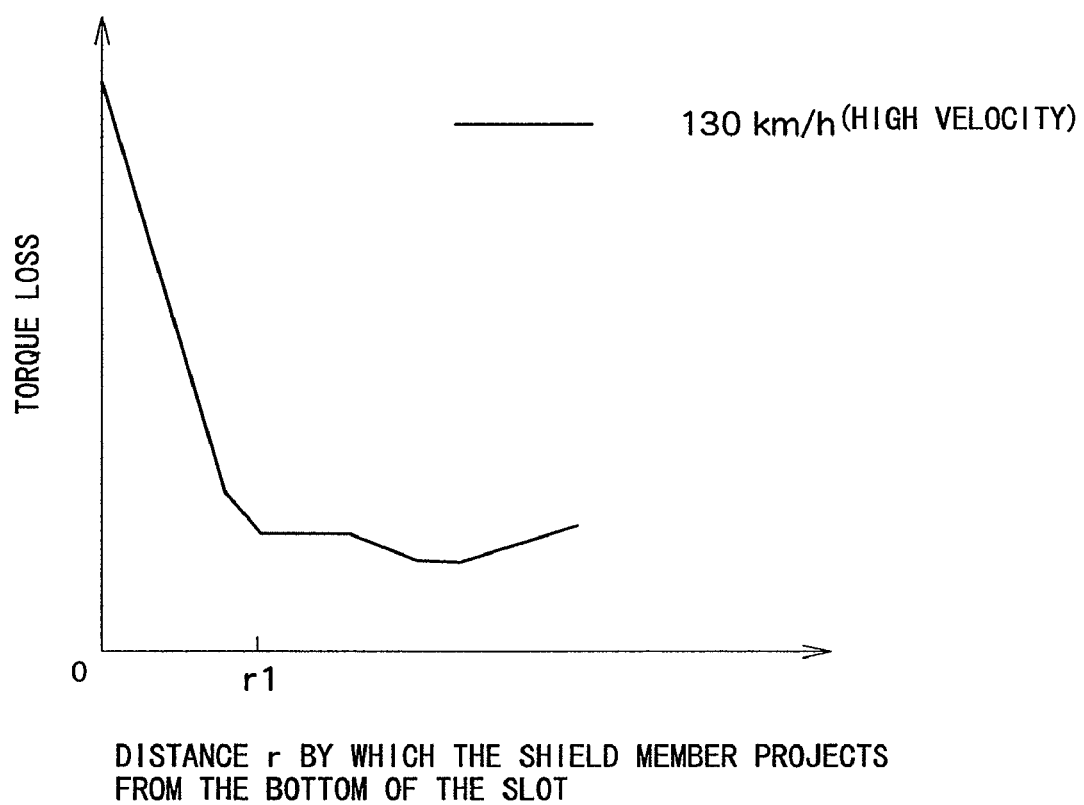
FIG. 6 is a diagram illustrating a relationship between distance r by which the shield member projects from the bottom portion of the slot and the torque loss generated in the electric rotating machine due to oil agitation resistance acting on the rotor.

It should be noted that the shield member 90 need not entirely cover the opening 86 of the slot 82 during high-velocity rotation of the rotor 18. This point will be explained referring to FIG. 6. FIG. 6 shows a relationship between distance r by which the shield member 90 projects from the bottom portion 84a of the slot 82 and the torque loss generated in the electric rotating machine 10 due to resistance acting on the rotor 18. FIG. 6 illustrates a state in which the vehicle 1 is traveling at a high velocity (130 km/h), i.e., the rotor 18 is rotated at a high velocity.

In a state in which the rotor 18 is rotated at a high velocity, the torque loss becomes greatest when distance r by which the shield member 90 projects is set to zero, and sharply decreases as the projecting distance r is increased up to r1, as shown in FIG. 6. The torque loss is not further reduced by setting distance r to a value greater than r1.

Accordingly, by setting the constant of the spring 92 to a value that causes the shield member 90 to project from the bottom portion of the slot 82 by distance r1 in a state in which the rotor 18 is rotated at a high velocity, it is possible to reduce the torque loss of the electric rotating machine 10, i.e., oil agitation resistance acting on the rotor 18, generated in this state. Further, by restraining the distance by which the shield member 90 projects from exceeding r1, i.e., by restraining from projecting more than necessary, the shield member 90 does not obstruct the discharge of the lubricating oil out of the slot 82 when rotation of the rotor 18 is started from a stopped state, or the flow of the lubricating oil traversing within the slot 82 during low-velocity rotation of the rotor 18. In other words, it is possible to compatibly achieve both the reduction of oil agitation resistance during high-velocity rotation of the rotor 18 and the capability to discharge the lubricating oil from within the slot 82 when rotation of the rotor 18 is started.

As explained above, according to the electric rotating machine 10 of the present embodiment, a means (shield members 90, springs 92) for shielding the lubricating oil from flowing into the slots 82 from a portion outside the rotor end face 18a are provided at the rotor end face 18a, such that oil agitation resistance during high-velocity rotation of the rotor 18 can be reduced.

While the shielding means for shielding the lubricating oil from flowing into the slots 82 according to the present embodiment have a structure that projects radially outward in response to an increase in the rotational velocity of the rotor 18, the present invention is not limited to this structure. Any structure is sufficient as long as it can shield the lubricating oil from flowing from a portion outside the rotor end face 18a into the slots 82. For example, it is also preferable to provide a plate member having a shape substantially identical to the end surface, and to cause this plate member to slide along the circumferential direction in response to an increase in the rotational velocity of the rotor 18 so as to cover the openings 86 of the slots.

Further, while the present embodiment is configured by providing the springs 92 as the supporting means for supporting the shield members 90 that cover the slot openings 86, the present invention is not limited to this configuration. Any configuration which provides support for the shield member 90 in such a manner that allows it to move in the radially outward direction in response to an increase in the rotational velocity of the rotor 18 may be employed. For example, it is also preferable to provide an actuator as the supporting means, and to perform drive control of the actuator such that the shield member 90 moves in the radially outward direction in response to an increase in the rotational velocity.

Second Embodiment

Figure 7:
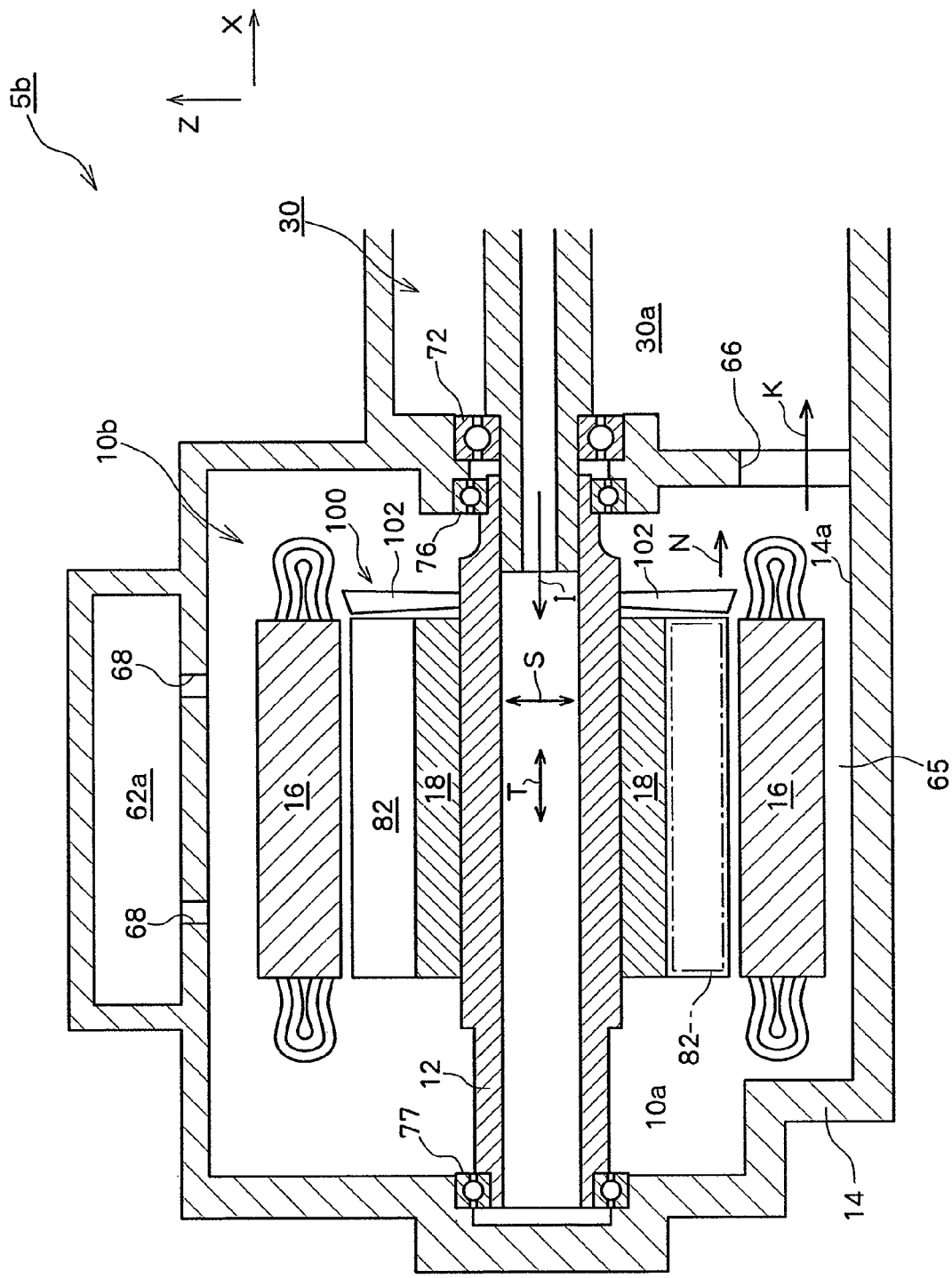
FIG. 7 is a vertical cross-sectional view of an electric rotating machine according to a second embodiment, and is a cross-sectional view taken along line A-A in FIG. 2.
Figure 8:
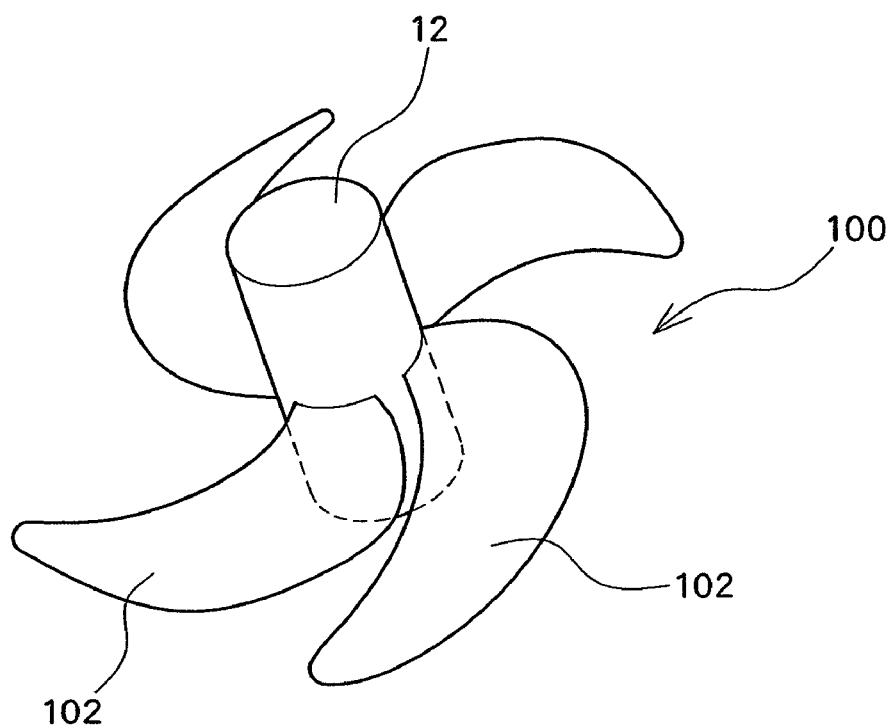
FIG. 8 is a perspective view of a rotational shaft and a fan constituting the electric rotating machine of the second embodiment.

A drive device 5b employing an electric rotating machine 10b according to the present embodiment will next be described referring to FIGS. 7 and 8. The electric rotating machine 10b is employed as a replacement for the electric rotating machine 10 in the drive device 5 of the vehicle 1 shown in FIGS. 1 and 2. FIG. 7 shows a vertical cross-sectional view of the electric rotating machine 10b, while FIG. 8 shows a perspective view of the rotational shaft 12 of the rotor 18. The configuration in the present embodiment differs from that of the first embodiment in the feature that a fan 100 is provided as means for shielding the lubricating oil from flowing into the slots 82, as will be described in detail below. Structures that are in common with the first embodiment are labeled with the same reference numerals, and their descriptions are not repeated below.

In the present embodiment, the fan 100 is provided at the rotor end face 18a on the gear chamber 30a side so as to shield the openings 86 of the slots 82 described in FIG. 3. The fan 100 is integrally coupled to the rotational shaft 12 of the rotor 18, and, when the electric rotating machine 10 is operated and the rotor 18 is rotated, the fan 100 rotates together with the rotor 18 with the rotational shaft 12 serving as the rotational axis. As shown in FIG. 8, this fan 100 comprises a plurality of vanes 102, and these vanes 102 are directly coupled to the rotational shaft 12. The shapes of the vanes 102 are designed such that, when the fan 100 is rotated, a flow (denoted by arrow N) from the rotor end face 18a outward along the axial direction of the rotational shaft 12 is created. The size of the vanes 102 in the radial direction (denoted by arrow S) of the rotational shaft can be selected arbitrarily in accordance with the shapes of the housing 14, the stator 16, or the like as long as the size enables to shield at least the openings 86 of the slots 82.

In a case in which the salient poles 80 of the rotor 18 are immersed in the lubricating oil while the rotor 18 is in the stopped state, when the rotor 18 starts rotating, the fan 100 causes the lubricating oil within the slots 82 to be paddled out and to flow outward along the rotational axis direction together with air within the slots 82. This flow creates a flow in the lubricating oil accumulated at the bottom 14a of the housing 14 of the motor chamber 10a toward the gear chamber 30a as denoted by arrow K. Further, also in a case in which the salient poles 80 are not immersed in the lubricating oil, air within the slots 82 is forced out to create an axially outward air flow as denoted by arrow N, thereby creating a flow in the lubricating oil accumulated at the bottom 14a of the housing 14 toward the gear chamber 30a. By creating an axially outward flow of air and lubricating oil as described above at a flow strength in accordance with the rotor rotational velocity, lubricating oil is restrained from flowing into the slots 82 from a portion outside the rotor end face 18a in the axis direction of the rotational shaft 12.

With the above arrangement, lubricating oil accumulating inside the motor chamber 10a when the rotor 18 is in the stopped state can be paddled out toward the gear chamber 30a by the rotation of the rotor 18, thereby reducing the oil surface level within the motor chamber 10a. In addition, even when the rotational velocity of the rotor 18 is increased, the axially outward flow created by the fan 100 shields the lubricating oil from flowing into the slots 82, such that oil agitation resistance during high-velocity rotation of the rotor 18 can be reduced.

Figure 9:
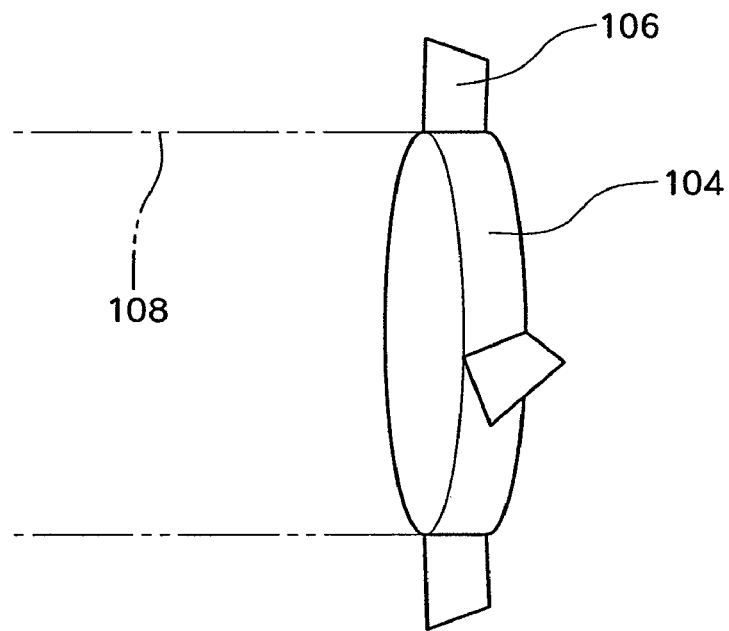
FIG. 9 is a diagram showing a variation example of a fan constituting the electric rotating machine of the second embodiment.

While the fan 100 in the present embodiment is configured with a plurality of vanes 102 coupled to the rotational shaft 12, the present invention is not limited to this structure. Any structure is sufficient as long as it can create an axially outward flow in the lubricating oil within the motor chamber 10a so as to shield lubricating oil from flowing into the slots 82. For example, as shown in FIG. 9, it is also preferable to form the fan using a disc-shaped member 104 for shielding the slots 82 at the rotor end face 18a, and vanes 106 provided on the outer periphery thereof.

Third Embodiment

Figure 10:
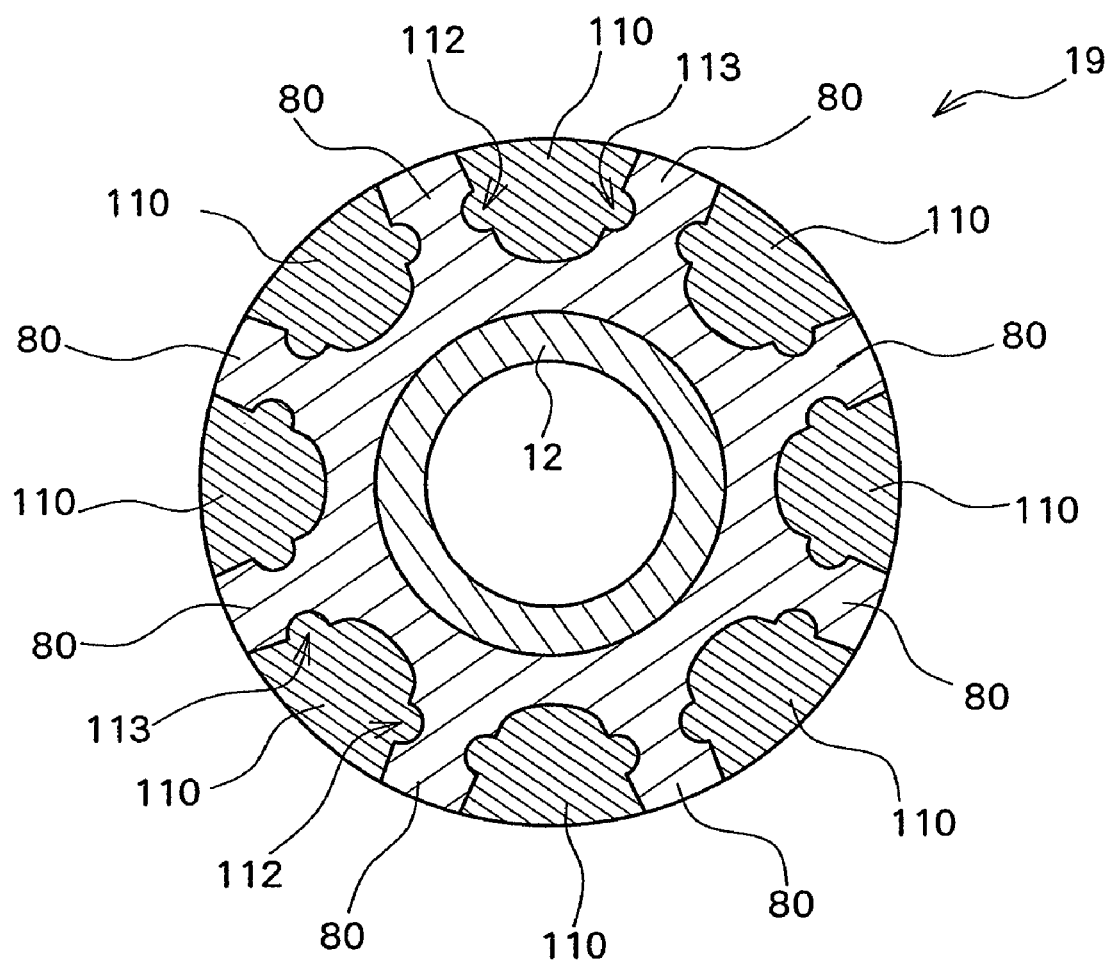
FIG. 10 is a diagram illustrating an end face of a rotor constituting an electric rotating machine according to a third embodiment.

In the above descriptions, a slot 82 is present between adjacent salient poles 80 of the rotor 18, and, when the rotor 18 is viewed from the axial direction, an opening 86 is present between adjacent salient poles 80. FIG. 10 is a diagram illustrating a rotor 19 viewed from the axial direction, in which, to state in short, each of the slot 82 portions is filled with inter-pole filling member 110 provided as means for shielding oil from entering between adjacent salient poles 80.

In the rotor 19 in which the respective spaces between adjacent salient poles 80 are filled with the inter-pole filling members 110, the rotor outer periphery is configured in a uniform circumferential shape, and the rotor 19 is configured to have a cylindrical shape having the rotational shaft 12 at the center. The inter-pole filling members 110 may be arranged in separate forms in the respective slots 82 between adjacent salient poles, or may be arranged while being connected to one another at one or both end sides along the axial direction of the rotor 19.

The material of the inter-pole filling members 110 that fill the space between adjacent salient poles of the rotor 19 is preferably a material that does not impair the performance of the rotor 19 of the electric rotating machine. For example, a non-magnetic material having a low specific mass is preferable. As this type of material, it is possible to employ a non-iron light metal, a resin material, and the like. When employing a resin material, the core portion made of magnetic material and the inter-pole filling portions can be integrally molded using a resin molding technique.

As shown in FIG. 10, concavities 112, 113 are provided on the side walls of a salient pole 80. These concavities 112, 113 are connecting members that prevent the inter-pole filling members 110 from separating from the rotor 19. While the concavities 112, 113 are provided on both side walls of each salient pole 80 in the example of FIG. 10, each salient pole may be provided with a concavity on only one side wall. Further, the concavities 112, 113 may be grooves that extend along the axial direction, or alternatively may be appropriately-shaped dents that are discretely provided on the side walls of each salient pole 80. Moreover, in a configuration in which the inter-pole filling members 110 are arranged while being connected to one another at one or both end sides along the rotor 19 axial direction, the concavities 112, 113 may be only provided on at least one of the salient poles 80 or at an end portion of the rotor 19.

Figure 11:
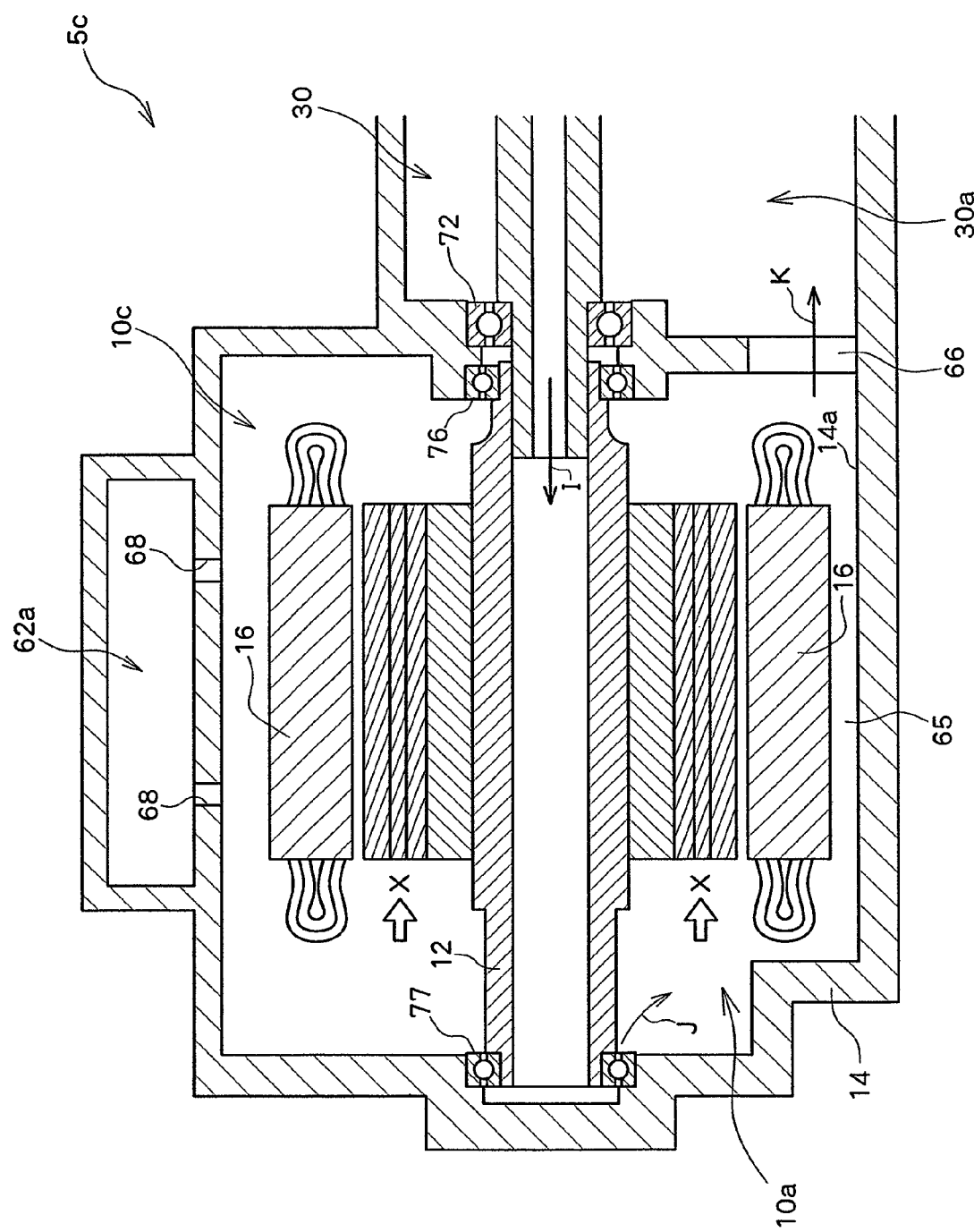
FIG. 11 is a diagram explaining the flow of a lubricating oil in the electric rotating machine of the third embodiment.

FIG. 11 is a diagram explaining the flow of a lubricating oil in a drive device 5c including an electric rotating machine 10c provided with the rotor 19 in which the respective spaces between adjacent salient poles 80 are filled with the inter-pole filling members 110. Elements that are in common with those in FIGS. 3 and 7 are labeled with the same reference numerals, and detailed descriptions of those elements are not repeated below. As explained above in relation to FIGS. 2 and 3, when the drive device 5c is operated and the vehicle starts moving, rotation of the ring gear causes the lubricating oil within the gear chamber 30a to be scooped up to the upper tank 62a. The lubricating oil scooped up to the upper tank 62a drips down through the communicating holes 68 to cool the stator 16, and flows into the gear chamber 30a via the tank chamber through a lubricating oil path not shown.

The lubricating oil that flows into the gear chamber 30a flows into the hollow portion of the rotational shaft 12 as shown by arrow I, lubricates bearings 76, 77 that support the rotational shaft 12 as shown by arrow J, and flows into the motor chamber 10a. Subsequently, the lubricating oil flows in the lubricating oil path 65 formed between the stator 16 and the housing 14, as well as through the space between the stator 16 and the rotor 18, and then flows through the communicating hole 66 located between the motor chamber 10a and the gear chamber 30 as shown by arrow K, thereby returning to the gear chamber 30a.

As described above, when the lubricating oil is collected and circulated by the operation of the drive device 5c, the lubricating oil cools the stator 16 by dripping from the upper tank chamber 62a, and also lubricates the respective bearings located in the motor chamber 10a and the gear chamber 30. During the above operation, because the rotor 19 having the salient poles 80 is configured such that the respective spaces between adjacent salient poles 80 are filled with the inter-pole filling members 110 according to the arrangement of FIG. 10, the lubricating oil does not flow into between adjacent salient poles 80 as denoted by mark X in FIG. 11, such that oil agitation resistance caused by the rotating rotor 19 can be greatly reduced.

Fourth Embodiment

Figure 12:
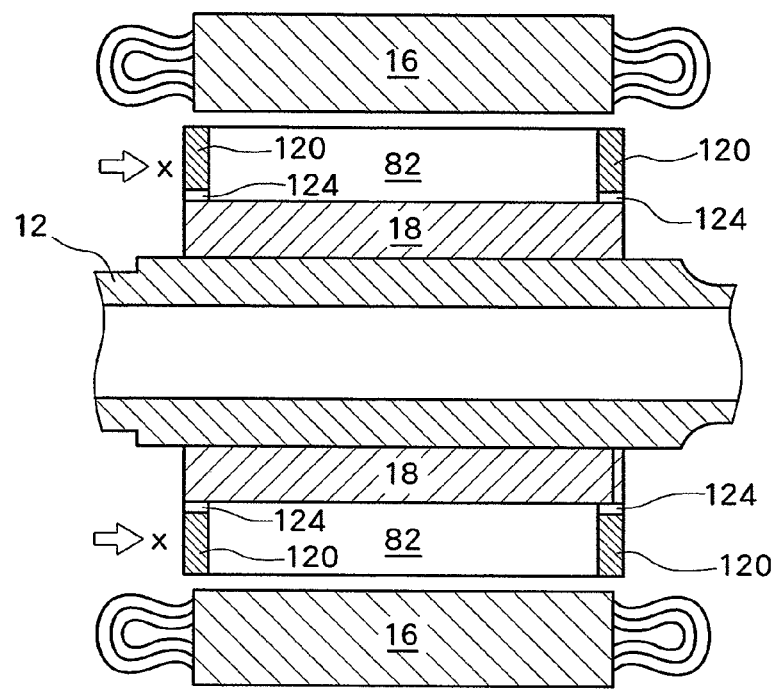
FIG. 12 is a diagram showing a part of a vertical cross-sectional view of an electric rotating machine according to a fourth embodiment.
Figure 13:
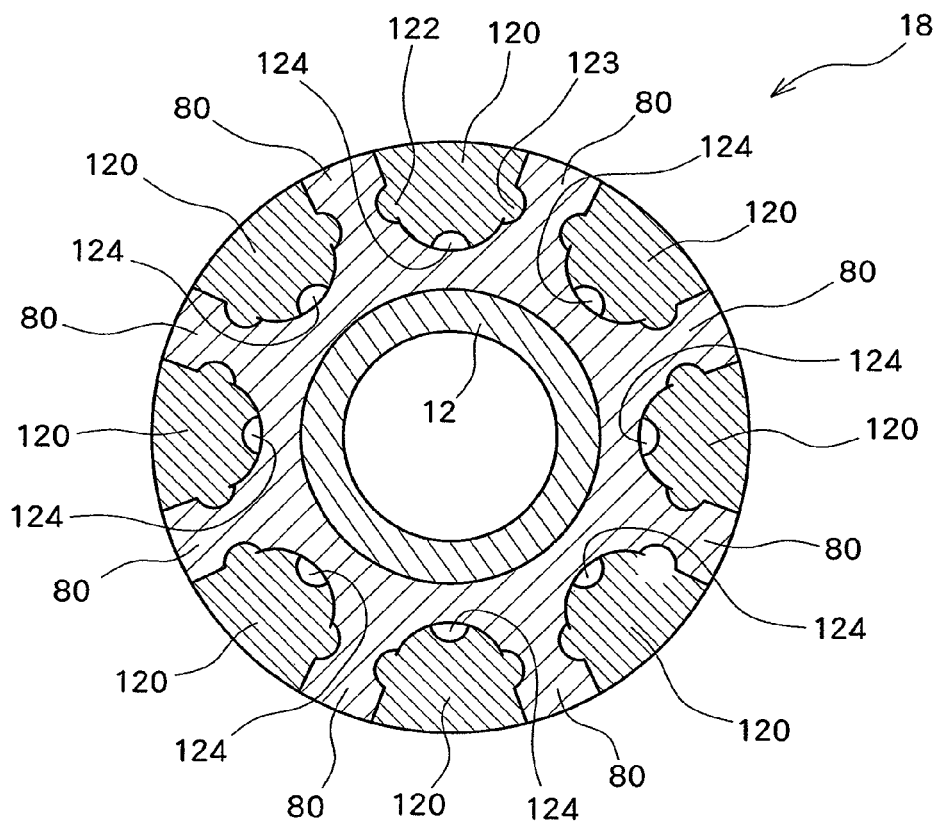
FIG. 13 is a diagram illustrating an end face of a rotor constituting the electric rotating machine of the fourth embodiment.

In the above descriptions, a slot 82 is present between adjacent salient poles 80 of the rotor 18, and, when the rotor 18 is viewed from the axial direction, an opening 86 is present between adjacent salient poles 80. FIGS. 12 and 13 relate to a configuration in which a shield plate 120 is provided at each slot 82 portion as means for shielding oil from flowing into between adjacent salient poles 80 and reducing oil agitation resistance. FIG. 12 shows a part of a vertical cross-sectional view of an electric rotating machine, while FIG. 13 is a diagram illustrating an end face of a rotor constituting the electric rotating machine The shield plates 120 do not serve to entirely fill in the slot 82 portions along the axial direction, but are plate members that are arranged at the both end portions of the rotor 18. Accordingly, in a region between the shield plates 120 arranged at both end portions of the rotor 18, the slot 82 is made to remain as it is open. In order to discharge oil that may be present within a slot 82 to the outside of the rotor, an oil outlet 124 connecting the slot 82 to outside of the rotor is provided in each slot 82. As shown in FIGS. 12 and 13, the oil outlet 124 is arranged at the bottom face side of the slot 82, that is, a location in the slot 82 having the shortest radial distance from the rotational shaft 12.

By arranging a shield plate 120 at the rotor 18 end face for each slot 82 between adjacent salient poles 80, the rotor 18 is configured to have flat shapes at both end portions. While the shield plates 120 are arranged in separate forms in the respective slots 82 between adjacent salient poles 80 in FIGS. 12 and 13, the shield plates 120 may also be arranged to be connected to one another at each end side of the rotor 18 along the axial direction. In that case, the shield plates 120 would be configured as connected annular plate members at both end sides of the rotor 18.

As shown in FIG. 13, concavities 122, 123 are provided on the side walls of a salient pole 80. These concavities 112, 113 are connecting members that prevent the shield plates 120 from separating from the rotor 18, and are similar to the concavities described in FIG. 11. It is particularly to provide these concavities 122, 123 when the shield plates 120 are independently arranged in separate forms in the respective slots. While the concavities 122, 123 are provided on both side walls of each salient pole 80 in the example shown in FIG. 13, each salient pole may be provided with a concavity on only one side wall. In an embodiment in which, as the shielding means, annular shield plates are provided at the both end sides along the rotor 18 axial direction, the concavities 122, 123 may be provided on only one or more of the salient poles 80.

The material of the shield plates 120 is preferably one that it does not change the performance of the rotor 18 constituting a part of the electric rotating machine. For example, a non-magnetic material having a low specific mass is preferable. As this type of material, it is possible to employ a non-iron light metal, a resin material, and the like. When employing a resin material, the core portion made of magnetic material and the shield plate can be integrally molded using a resin molding technique.

Figure 14A:
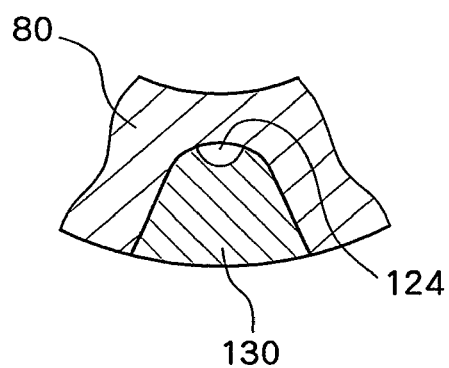
FIG. 14A is a first diagram showing a different example of the oil outlet in the shield plate in the fourth embodiment.
Figure 14B:
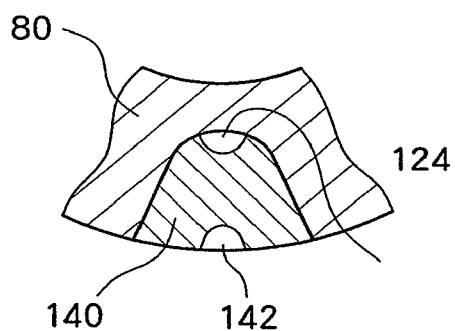
FIG. 14B is a second diagram showing a different example of the oil outlet in the shield plate in the fourth embodiment.
Figure 14C:
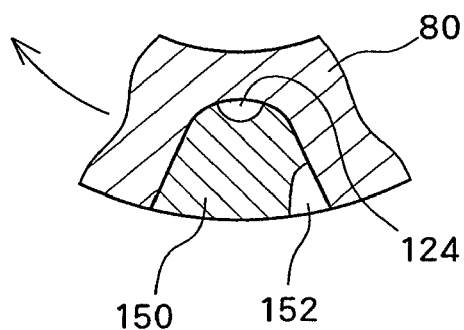
FIG. 14C is a third diagram showing a different example of the oil outlet in the shield plate in the fourth embodiment.

FIGS. 14(*a*), 14(*b*), and 14(*c*) are diagrams showing a number of examples of how the oil outlets may be provided, each illustrating a rotor end face. FIG. 14(*a*) is a diagram showing a basic form in which no concavity is provided on the side walls of the salient poles 80. In this case, a shield plate 130 is provided in a slot between adjacent salient poles 80 by the above-noted integral molding method or an appropriate adhesion technique, while forming an oil outlet 124 at the bottom of the slot. By means of the oil outlet 124, oil within the slot remaining between the shield plates 130 located at the both ends of the rotor can be discharged.

FIG. 14(*b*) is a diagram showing a shield plate 140 in which, with respect to FIG. 14(*a*), an oil outlet 142 is further provided. The oil outlet 142 is provided at the top portion of the shield plate 140, that is, at a location having the longest radial distance from the rotational shaft. By means of this oil outlet 142, oil that dwells within the slot located at a lower position along the gravitational direction of the rotor can be discharged to the outside.

While the oil outlet 142 in FIG. 14(*b*) is arranged at a substantially central portion along the circumferential direction of the shield plate 140 provided in the slot, in a shield plate 150 shown in FIG. 14(*c*), an oil outlet 152 is provided abutting a side face of a salient pole 80. The oil outlet 152 is preferably provided abutting the side wall located on the downstream side along the rotating direction of the rotor, among the two side walls of the salient pole 80. The rotor rotational direction is shown by an arrow in FIG. 14(*c*), and the oil outlet 152 is provided abutting the salient pole side wall located on the downstream side with respect to that arrow. By arranging in this manner, it is possible to restrain oil from being guided into the slot along with the rotation of the rotor, and to cause any oil within the slot to be efficiently discharged outside.

Figure 15:
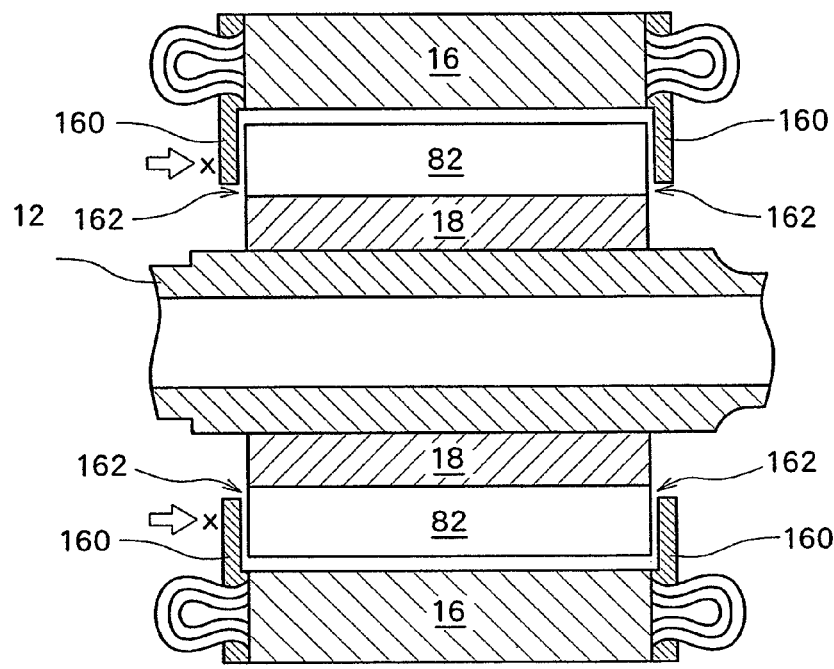
FIG. 15 is a diagram showing a part of a vertical cross-sectional view of an electric rotating machine according to a further example of the fourth embodiment.
Figure 16:
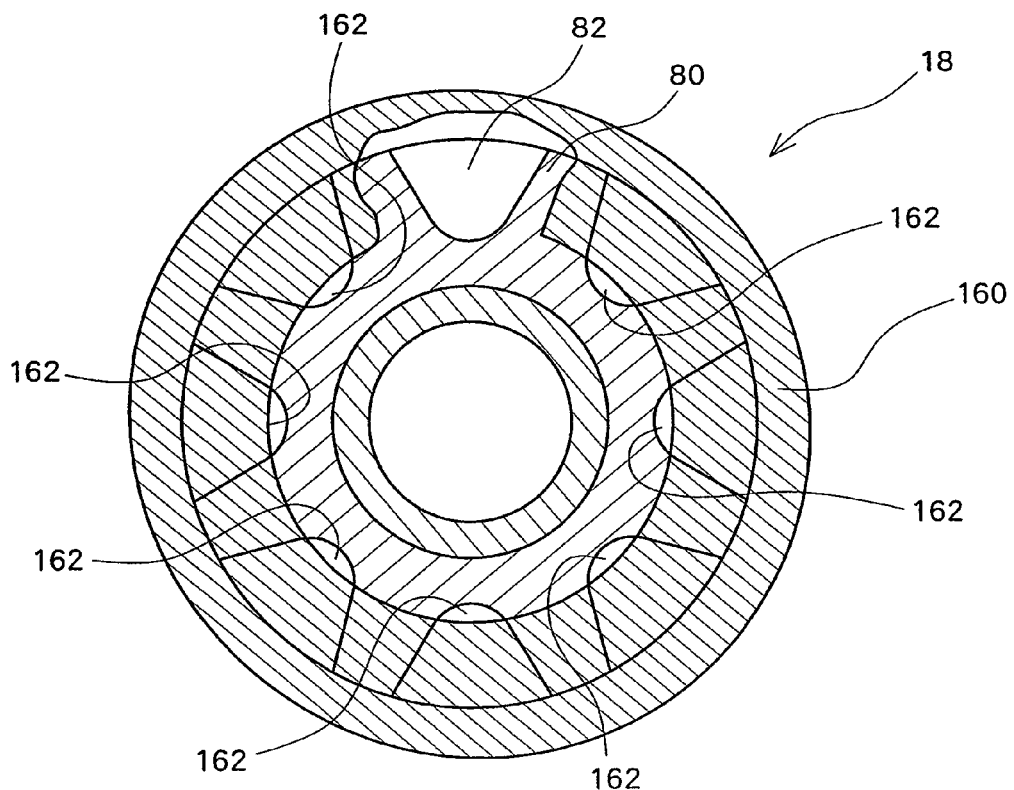
FIG. 16 is a diagram illustrating a view from an end face side of a rotor constituting the electric rotating machine according to the further example of the fourth embodiment.

While the shield plates are provided at the both end portions of the rotor 18 in FIGS. 12, 13, 14(*a*), 14(*b*), and 14(*c*), it is also possible to provide the shield plates on the stator. FIGS. 15 and 16 are diagrams showing an example in which, as means for shielding oil from flowing into between adjacent salient poles 80, shield plates 160 are provided on the stator in positions facing the both ends of the rotor 18 so as to shield the respective slot 82 portions. FIG. 15 shows a portion of a vertical cross-sectional view of an electric rotating machine, while FIG. 16 shows a diagram illustrating a view from an end face side of the rotor 18 constituting the electric rotating machine. In FIG. 16, the shield plate 160 is partially cut away to show the salient poles 80 and the slot 82.

The shield plates 160 are arranged facing both ends of the rotor 18 while leaving a clearance to a degree which avoids obstructing the rotation of the rotor 18. The shield plate 160 is an annular member designed so that the position of its inner diameter is on the outer diameter side of the bottom portions of the slots 82. That is, the radius of the bore of the shield plate 160 is longer than the radial distance from the rotational shaft 12 to the bottom portions of the slots 82. In other words, the shield plate 160 does not shield the slots 82 entirely, and the bottom portions of the slots 82 are partially exposed. Accordingly, these gaps where the slots 82 are exposed function as oil outlets 162. With this arrangement, it is possible to discharge flowing into the slots 82 through the gaps, which function as the oil outlets 162.

As described above, it is possible to provide a shield plate on the rotor or the stator, to restrain oil from flowing from outside the rotational shaft into the slots between the salient poles of the rotor, to reduce oil agitation resistance, and to discharge the oil that flowed into the slots to outside via oil outlets that connect the slots with the outside.

The invention claimed is:

1. An electric rotating machine that includes a rotor in which salient poles projecting along a radial direction that is perpendicular to a rotational axis are arranged along a circumferential direction at predetermined intervals, and operates in a state in which a rotor in a non-operating state is immersed in oil along an axial direction at a bottom portion within a housing that houses the rotor in a horizontal direction, and the rotor starts operation from the immersed state enabling oil to be circulated, the electric rotating machine comprising:

a shielding means provided at an end face of the rotor for shielding oil from flowing from a portion outside the end face in the axial direction of a rotational shaft into a slot between adjacent salient poles of the rotor.

2. The electric rotating machine as defined in claim 1, wherein
the shielding means projects outward along the radial direction in response to an increase in the rotor rotational velocity, so as to cover an opening of the slot by a larger area.

3. The electric rotating machine as defined in claim 2, wherein the shielding means is movable in the radial direction along the rotor end face, and includes:
a shield member for covering the opening of the slot, and
a support means for supporting the shield member to be movable outward along the radial direction in response to an increase in the rotor rotational velocity.

4. The electric rotating machine as defined in claim 3, wherein
one end of the support means is connected to the shield member and the other end connected to the rotor, the support means acting as a biasing member that biases the shield member to a position located at a predetermined distance from the rotational shaft; and
the shield member is a movable member that moves outward along the radial direction against the biasing force of the biasing member, by a centrifugal force applied in response to an increase in the rotor rotational velocity.

5. The electric rotating machine as defined in claim 4, wherein
the biasing member is a spring that extends along the radial direction in response to an increase in the rotor rotational velocity.

6. An electric rotating machine that includes a rotor in which salient poles projecting along a radial direction from a rotational shaft are arranged along a circumferential direction at predetermined intervals, and operates in a state in which a rotor in a non-operating state is immersed in oil along an axial direction at a bottom portion within a housing that houses the rotor in a horizontal direction, and the rotor starts operation from the immersed state enabling oil to be circulated, the electric rotating machine comprising:

a fan that creates, in the oil present within the housing, a flow outward along an axial direction so as to shield the oil from flowing from a portion outside the end face in the axial direction into the slot between the adjacent salient poles of the rotor.

7. The electric rotating machine as defined in claim 6, wherein
the fan is configured by coupling a plurality of vanes on the rotational shaft of the rotor.

8. An electric rotating machine that includes a rotor in which a plurality of salient poles projecting along a radial direction that is perpendicular to a rotational axis are arranged along a circumferential direction at predetermined intervals, and operates in a state in which a rotor in a non-operating state is immersed in oil along an axial direction at a bottom portion within a housing that houses the rotor in a horizontal direction, and the rotor starts operation from the immersed state enabling oil to be circulated, the electric rotating machine comprising:

a shielding means provided on the rotor for shielding oil from flowing from outside a rotational shaft into a slot between adjacent salient poles of the rotor.

9. The electric rotating machine as defined in claim 8, wherein
the shielding means is a member composed of a non-magnetic material for filling between the salient poles.

10. The electric rotating machine as defined in claim 8, further comprising
a connecting member for connecting the inter-pole filling member and at least one salient pole with one another.

11. An electric rotating machine that includes a rotor in which a plurality of salient poles projecting along a radial direction that is perpendicular to a rotational axis are arranged along a circumferential direction at predetermined intervals, and operates in a state in which a rotor in a non-operating state is immersed in oil along an axial direction at a bottom portion within a housing that houses the rotor in a horizontal direction, and the rotor starts operation from the immersed state enabling oil to be circulated, the electric rotating machine comprising:

a shielding means provided on the rotor or a stator for shielding oil from flowing from outside a rotational shaft of the rotor into a slot between adjacent salient poles of the rotor,
wherein the shielding means is a shield plate with outlet, having an oil outlet connecting between the slot and outside.

12. The electric rotating machine as defined in claim 11, wherein
the shielding means is a shield plate composed of a non-magnetic material.

* * * * *